Figure 2:
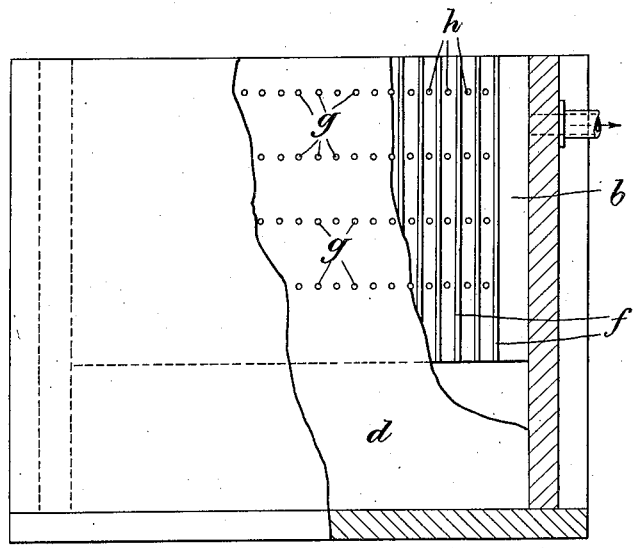

Sept. 5, 1933.  H. G. HILLS  1,925,322

ELECTROLYTIC PRODUCTION OF WHITE LEAD

Filed May 28, 1932

H. G. Hills
INVENTOR

By Marks & Clerk
Attys.

Patented Sept. 5, 1933

1,925,322

UNITED STATES PATENT OFFICE 1,925,322

ELECTROLYTIC PRODUCTION OF WHITE LEAD

Horace Gastineau Hills, Stockport, England

Application May 28, 1932, Serial No. 614,211, and in Great Britain May 14, 1931

3 Claims. (Cl. 204—61)

This invention relates to the electrolytic production of white lead by the employment of an aqueous electrolyte containing a nitrate such as sodium or other alkali metal nitrate in solution.

In the electrolytic production of white lead in the manner in question carbon dioxide is produced in or is introduced into the electrolyte from an external source by, for instance, maintaining the electrolyte in circulation and passing carbon dioxide into the electrolyte prior to its introduction into the electrolytic cell or by the introduction into the electrolyte while in the electrolytic cell of carbon dioxide from an external source or by both of such means.

In the known proposals for producing white lead electrolytically it has been found very difficult to produce white lead which is not spongy and which is not of a bad colour. Many investigations have been made for the purpose of overcoming these defects of electrolytic methods. It is considered to be necessary to use current of low amperage in order to avoid certain secondary reactions in the electrolyte which result in the production of impurities, tending to discolour the final product.

By careful investigation and experiments I have discovered that the production of spongy lead can be avoided, by the use in the electrolyte of a small proportion of a water dispersible colloid, for instance glue or gelatine, and that secondary reactions can be avoided or can be caused to balance out if the amperage of the current employed exceeds 20 per square foot of immersed cathode surface. In additional I have found that the electrolyte is more satisfactorily saturated with carbon dioxide so that the carbon dioxide is not used up prematurely, which results in the production of a mixed or inferior deposit, if the electrolyte is atomized in the presence of carbon dioxide gas. I have further found that by the employment of a small proportion of formic acid in the electrolyte I obtain improved results as such acid reduces the carbonate and increases the hydrate content of the electrolyte.

The invention comprises the employment in an electrolyte consisting of an aqueous solution of a nitrate, of a proportion of a water dispersible colloid, for instance, glue or gelatine.

Thus, for example, in accordance with the invention, the electrolyte may consist of an aqueous solution of sodium nitrate to which has been added a proportion of a water-dispersible colloid, for instance glue or gelatine. The glue or gelatine may be used as a 0.01% solution in water.

About 4 pounds of gelatine or glue are used in the production of one ton of white lead.

Preferably, the electrolyte consists of a weak solution of sodium nitrate, containing, for example, 0.75 to 2 per cent. of sodium nitrate.

A further feature of the invention comprises effecting the electrolysis with the aid of electrodes spaced at a distance of ½" to ¾" apart and with a minimum current density of about 20 amperes per square foot of immersed cathode surface.

Another feature of the invention comprises the employment of formic acid for correcting the alkalinity of the electrolyte and for controlling the proportion of hydrate to carbonate in the product.

A still further feature of the invention comprises effecting the saturation of the electrolyte with carbon dioxide by atomizing the electrolyte in the presence of gaseous carbon dioxide, and then passing the saturated electrolyte into the electrolyzer.

While it is preferred to employ an electrolyte consisting of a solution of an alkali metal nitrate, such as sodium, in the absence of added salts, the invention is not necessarily to be regarded as restricted to the use of such an electrolyte. However, it has been found that the intention introduction into the electrolyte of carbonates, bi-carbonates, chlorates or perchlorates is detrimental to the process and to the character of the product obtained. Further, it is to be observed that while formic acid is preferably used for correcting the alkalinity which may develop in the electrolyte, nitric acid may be used but it is more expensive and requires a greater degree of care in handling. In any case, the proportion of acid introduced for correcting the alkalinity will be extremely small and normally the acid for correcting the alkalinity will be introduced in a highly dilute state. The formic acid may be used as a 1% solution in water.

Generally, for securing saturation of the electrolyte with carbon dioxide atomization of the electrolyte in the presence of gaseous carbon dioxide is alone resorted to, and to secure the necessary conditions for effecting saturation the electrolyte is maintained in circulation through the electrolytic cell or cells, the electrolyte being atomized in suitable apparatus external to the cells in the presence of carbon dioxide and thereafter returned to the cells. By this method of securing carbonation, the electrolyte may be maintained substantially fully charged with carbon dioxide while passing through the cell and its action in the cell may thus be rendered uniform.

Within limits the amperage, voltage and concentration of salt in the electrolyte are mutually inter-dependent factors.

Preferably, with an electrolyte containing in solution 1% of nitrate of soda, the electrodes are spaced ½" to ¾" apart, the current density employed being as a minimum 20 amperes and usually 25 amperes or more. The anodes are lead.

The employment in the electrolyte of a colloid such as glue operates to prevent the production of spongy lead and in this and in other ways has a favourable influence upon the character of the product.

Figure 1:
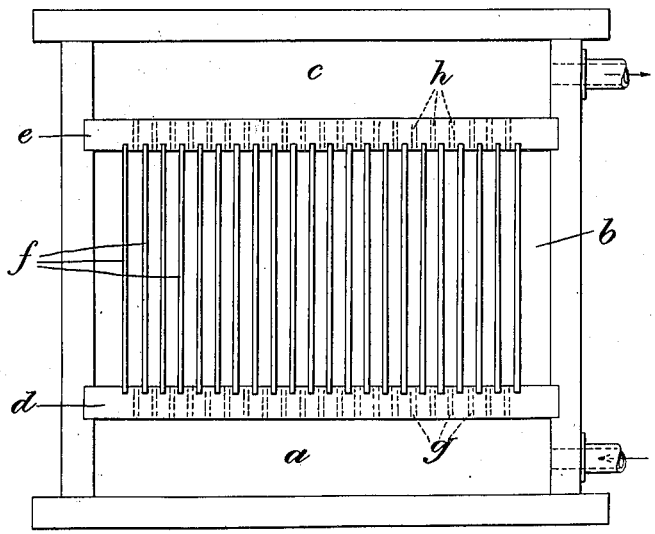

The accompanying explanatory drawing shows in plan view (Figure 1) and elevation (Figure 2) with parts broken away, a construction of electrolyzer for carrying out my invention.

The electrolyzer vat or cell comprises an ante chamber or compartment $a$, a depositing chamber $b$ and an exit chamber $c$, there being vertical partitions $d$ and $e$ dividing the depositing chamber $b$ from the other chambers which are at its opposite sides. The electrodes $f$ are slid into vertical slots or grooves in the adjacent faces of said partitions $d$ and $e$. The electrolyte enters and leaves the depositing chamber by way of holes $g$ and $h$ respectively located between the vertical slots so that the electrolyte is caused to flow between the electrodes from side to side of the chamber. The total cross sectional area of the said holes is proportioned with relation to the rate of inflow of electrolyte to the ante-chamber to ensure a substantially even flow through all the holes. In practice I have found that if the holes are of excessive total area with relation to the quantity of electrolyte being passed, the rate of flow between some of the electrodes may be so slow that the carbon dioxide is used up before the electrolyte reaches the exit chamber, resulting in unsatisfactory working of the electrolyzer and the production of a mixed or inferior deposit.

The electrolyte by being passed through both an ante-chamber $a$ and an exit chamber $c$ at the opposite sides of the depositing chamber $b$ has its flow steadied with the result that in conjunction with the proper proportioning of the holes $g$ and $h$ giving access to and exit from the depositing chamber, I am able to obtain uniform deposits of white lead.

The electrolyte which leaves the electrolyzer is re-saturated with carbon dioxide, by being atomized in the presence of carbon dioxide, and returned to the ante-chamber.

If desired, the electrolyzer may be arranged for a downward flow of electrolyte instead of a horizontal flow.

What I claim is:—

1. A method of producing white lead electrolytically from lead anodes, consisting in forming an electrolyte from an aqueous solution of an alkali-metal nitrate and a water dispersible colloid of the character of glue or gelatine, saturating said solution with carbon dioxide gas and passing the electrolyte between the electrodes, the electrolyte being subjected to a current density of not less than 20 amperes per square foot of immersed cathode surface.

2. A method of producing white lead electrolytically from lead anodes, consisting in forming an electrolyte from an aqueous solution of an alkali metal nitrate and a water dispersible colloid of the character of glue or gelatine, saturating said solution with carbon dioxide gas externally to the electrolyzer and passing the electrolyte between the electrodes, the electrolyte being subjected to a current density of not less than 20 amperes per square foot of immersed cathode surface.

3. In a method of producing white lead electrolytically, as claimed in claim 2, the addition of a small proportion of formic acid to the electrolyte.

HORACE GASTINEAU HILLS.